United States Patent [19]

Faulkner

[11] Patent Number: 4,975,899
[45] Date of Patent: Dec. 4, 1990

[54] OPTICAL BROADCAST NETWORK

[75] Inventor: David W. Faulkner, Ipswich, England

[73] Assignee: British Telecommunications Public Limited Company, London, England

[21] Appl. No.: 235,873

[22] PCT Filed: Jan. 5, 1988

[86] PCT No.: PCT/GB88/00003

§ 371 Date: Aug. 17, 1988

§ 102(e) Date: Aug. 17, 1988

[87] PCT Pub. No.: WO88/05232

PCT Pub. Date: Jul. 14, 1988

[30] Foreign Application Priority Data

Jan. 5, 1987 [GB] United Kingdom ............... 8700069

[51] Int. Cl.$^5$ .................. H04B 10/04; H04J 14/08
[52] U.S. Cl. ........................ 370/4; 455/609; 455/613
[58] Field of Search ............ 455/601, 613, 607, 606, 455/608, 609, 610, 611, 612, 617; 370/4, 1

[56] References Cited

U.S. PATENT DOCUMENTS

| | | | |
|---|---|---|---|
| 3,315,177 | 4/1967 | Benson | 372/15 |
| 4,027,153 | 5/1977 | Kach | 455/612 |
| 4,047,117 | 9/1977 | Tuchyner | 455/603 |
| 4,302,835 | 11/1981 | McMahon | 370/4 |
| 4,399,564 | 8/1983 | Cowen | 455/608 |
| 4,628,501 | 12/1986 | Loscoe | 370/4 |
| 4,646,361 | 2/1987 | Usui | 455/601 |
| 4,775,971 | 10/1988 | Bergmann | 455/607 |

OTHER PUBLICATIONS

Proceedings of the IEEE, vol. 58, No. 10, Oct. 1970, (New York, U.S.), M. Ross et al.: "Short-Pulse Optical Communications Equipments", pp. 1719-1726.
IBM Journal of Research and Development, vol. 23, No. 5, Sep. 1969, (New York, U.S.) J. D. Crow: "GaAl) as Laser Requirements for Local Attached Data Link Applications", pp. 576-584.

Primary Examiner—Joseph A. Orsino
Assistant Examiner—L. Van Beek
Attorney, Agent, or Firm—Nixon & Vanderhye

[57] ABSTRACT

An optical communications network comprises a number of remote stations connected to a node by optical fiber transmission paths interconnected by power dividers, each remote station including an optical transmitter operating at a peak power and a low duty cycle for a short period. Typically the optical transmitter is enabled to transmit information for only 10% or less of the total time and for a maximum of 500 ns.

9 Claims, 1 Drawing Sheet

OPTICAL BROADCAST NETWORK

BACKGROUND OF THE INVENTION

This invention relates to an optical broadcast network in which optical signals in the form of pulses of light are broadcast over optical fibre transmission paths. Usually optical broadcast networks are used to transmit information at high speed between two nodes and are used to convey large volumes of information. The electro-optic devices which are used as transmitters in such systems usually have the form of semiconductor lasers and are part of sophisticated equipment including control circuitry to control the output of the laser as well as a heat sink and cooling arrangements to prevent the transmitter from overheating. The signal transmitted by such a transmitter may well be a time division multiplex signal so that a large number of different channels of information are transmitted simultaneously over the same optical fibre transmission path but, in this case, all of these channels of information are transmitted by the same optical transmitter.

According to this invention an optical broadcast network comprises a number of remote stations connected to a node by optical fibre transmission paths interconnected by optical power dividers, each remote station including an optical transmitter operating at a high peak power and a low duty cycle.

Typically by a low duty cycle the optical transmitter is enabled to transmit information for only 10% or less of the total time and for a maximum time of 500 ns is very much less than conventional optical transmitters which are able to transmit information for 100% of the time but, for, typically 50% of that time are operating to transmit data represented by no pulse of light. Preferably the information is transmitted for a maximum time of 250 ns and typically for 60 ns when the power divider has a splitting ratio of 1:128. It is also possible to transmit for periods as short as 0.5 or 1 ns. With an arrangement in accordance with this invention it is preferred that the optical broadcast network operates an optical time division multiplex system between the node and the number of remote stations with each remote station being enabled to transmit in its own, individual time slot so that the optical signals from the remote stations interleave with one another at the node.

One way, and the preferred way, in which the present invention can be used is to operate the optical transmitter at a high peak power many times greater than its maximum continuous power rating but, below its power damage rating under pulsed conditions. When, for example, the optical transmitter is operating a 10% duty cycle with a short period it is possible for the peak output power to be increased to ten times the maximum continuous power rating for the transmitter whilst still providing only the same thermal dissipation, assuming that the optical transmitter has a linear power to drive current relationship.

With such an arrangement it is possible to get a substantially constant received signal at the node no matter what splitting ratio is adopted in the optical power dividers by simply increasing the power of the optical transmitter in inverse proportion to the splitting ratio. Also with this arrangement failures can be readily identified. For example, if the optical transmitter is permanently turned ON either it fails catastrophically or a fuse or other protective element in series with the device isolates it within a short period of time or its optical output reduces so that it is immediately apparent at the receiving node that a failure has occurred because the output of one transmitter is very low.

Another way in which the present invention can be used is for the high peak power at which the optical transmitter of the remote station operates to be the maximum continuous rating of the optical transmitter. With this arrangement only a fraction of the normal heat load on the optical transmitter is generated and this reduces the need for a heat sink, allows the optical device to operate at a lower internal temperature at which it is more efficient, and usually eliminates the need for external or internal cooling devices. It also improves the life of the optical transmitter.

Depending upon the application it is possible to arrange for both of these groups of advantages to be gained simultaneously and thus, with a very short duty cycle of, for example, only 1% it would be possible to have an optical transmitter operating at ten times its maximum continuous rating but, at the same time, only dissipate 10% of the heat that it would generate if run continuously at its maximum rating and have its life increased, typically by ten times.

BRIEF DESCRIPTION OF THE DRAWINGS

Two particular examples of optical broadcast networks in accordance with this invention will now be described with reference to the accompanying drawings, in which.

DETAILED DESCRIPTION OF PRESENTLY PREFERRED EXEMPLARY EMBODIMENTS

Figure 1:
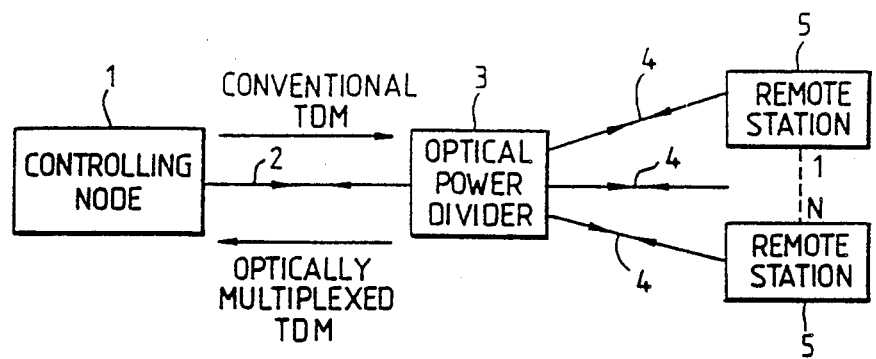
FIG. 1 is a diagram of a first network; and,
FIG. 2 is a diagram of part of a second network.

The first example represents a conventional time division multiplex transmission system with transmissions from a central controlling node 1 taking place over a first optical fibre transmission line 2 to an optical power divider 3. The signal power is divided in the divider 3 between N optical fibre transmission lines 4 which lead to N remote stations 5. Information is transmitted continuously over the transmission paths 2 and 4 to all of the remote stations 5 but, as usual in conventional time division multiplex systems, each remote station is enabled to receive only the information transmitted during its own time slot. The remote stations 5 communicate with the controlling node 1 by transmitting over the same optical fibre transmission paths 2 and 4, or alternatively over different optical fibre transmission paths with each remote station 5 being enabled to transmit only during its own predetermined transmission time slot. Typically the maximum time for which each remote station transmitter operates is 1/N of the total time and it may be much less than this. Each remote station 5 transmits information by modulating a sequence of low duty cycle pulses.

Figure 2:
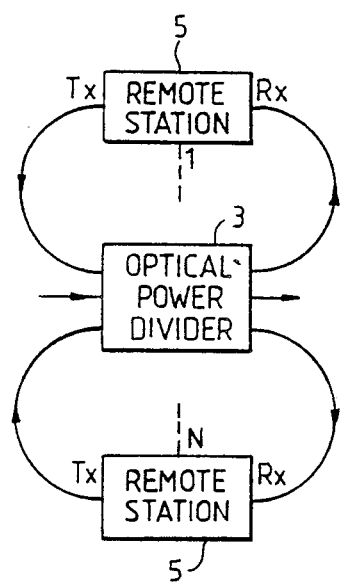

The second example which is shown in FIG. 2 allows each node to broadcast to every other node without the need for common control. Each node is allocated time slots in which it can transmit modulated low duty cycle pulses and these pulses form a time division multiplex in the optical signal power divider 3 which is received by other nodes on the network.

I claim:
1. In an optical communications network comprising:
a central node having an optical transmitter and an optical receiver;

a plurality of remote stations each having an optical transmitter and an optical receiver; and at least one optical fiber transmission medium coupled between the central node and the remote stations, said optical fiber transmission medium including a passive splitter arrangement having a ratio of 1:N and carrying multiplexed signals, the network being adapted for carrying return signals from the remote stations multiplexed passively onto said transmission medium, the improvement comprising:

arranging the optical transmitter of each said remote station to transmit information by modulating a sequence of low duty cycle pulses, each transmitted pulse having a peak power of N times the maximum continuous power rating of the transmitter and operating for not more than 1/N of the total time.

2. A network as in claim 1 wherein the optical transmitter of each remote station is arranged to operate for much less than 1/N of the total time.

3. A network as claimed in any of claims 1 and 2 wherein N is 128.

4. A network as claimed in any of claims 1 and 2 wherein the optical transmitter of each remote station is arranged such that each transmitted pulse has a duration of not more than 1 nanosecond.

5. In an optical communications network comprising:
a plurality of nodes each including an optical transmitter and an optical receiver; and
an optical fiber transmission medium coupled to the plurality of nodes, said transmission medium allowing each node to communicate with every other node, said optical fiber transmission medium including a passive optical signal power divider arrangement having a ratio of 1:N and carrying multiplexed signals, the improvement comprising:

arranging the optical transmitter of each said node to transmit information by modulating a sequence of low duty cycle pulses, each transmitted pulse having a peak power of N times the maximum continuous power rating of the transmitter and operating for not more than 1/N of the total time.

6. A network as in claim 5 wherein the optical transmitter of each node is arranged to operate for much less than 1/N of the total time.

7. A network as claimed in any one of claims 5 and 6 wherein N is 128.

8. A network as claimed in any one of claims 5 and 6 wherein the optical transmitter of each node is arranged such that each transmitted pulse has a duration of not more than 1 nanosecond.

9. An optical communications network comprising:
a central node having an optical transmitter and an optical receiver arrangement, said central node optical receiver for detecting pules having a predetermined constant vale of peak power;
a plurality of remote stations each having an optical transmitter and an optical receiver;
at least one optical fiber transmission medium coupled between the central node and the remote stations, said optical fiber transmission medium including a passive splitter arrangement having a ratio of 1:N and carrying multiplexed signals, the network being adapted for carrying return signals from the remote stations multiplexed passively onto said transmission medium,
the optical transmitter of each said remote station transmitting information by modulating a sequence of low duty cycle pulses, each transmitted pulse having a peak power of N times said predetermined constant value of peak power and operating for not more than 1/N of the total time.

* * * * *